United States Patent
Kong et al.

(10) Patent No.: US 10,319,971 B2
(45) Date of Patent: Jun. 11, 2019

(54) METHOD FOR MAKING LITHIUM-SULFUR BATTERY SEPARATOR

(71) Applicants: Tsinghua University, Beijing (CN); HON HAI PRECISION INDUSTRY CO., LTD., New Taipei (TW)

(72) Inventors: Wei-Bang Kong, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 142 days.

(21) Appl. No.: 15/653,542

(22) Filed: Jul. 19, 2017

(65) Prior Publication Data

US 2018/0062137 A1  Mar. 1, 2018

(30) Foreign Application Priority Data

Aug. 31, 2016  (CN) .......................... 2016 1 0799889

(51) Int. Cl.
*H01M 2/00* (2006.01)
*B32B 5/00* (2006.01)
(Continued)

(52) U.S. Cl.
CPC ............... *H01M 2/145* (2013.01); *B32B 5/12* (2013.01); *B32B 5/24* (2013.01); *H01M 2/1613* (2013.01); *H01M 2/1646* (2013.01); *H01M 2/1686* (2013.01); *H01M 2/18* (2013.01); *H01M 4/38* (2013.01); *H01M 4/382* (2013.01); *H01M 10/052* (2013.01)

(58) Field of Classification Search
CPC ............ H01M 2/00; H01M 2/10; H01M 2/14; H01M 2/14; H01M 2/145; H01M 2/16; H01M 2/16; H01M 2/161; H01M 2/161; H01M 2/1613; H01M 2/164; H01M 2/164; H01M 2/1646; H01M 2/168; H01M 2/168; H01M 2/1686; H01M 2/18; B32B 5/00; B32B 5/10; B32B 5/12; B32B 5/20; B32B 5/24
See application file for complete search history.

(56) References Cited

U.S. PATENT DOCUMENTS

| 2014/0147710 A1* | 5/2014 | Schaefer | H01M 2/162 429/50 |
| 2015/0236324 A1* | 8/2015 | Xiao | H01M 2/1686 429/144 |
| 2015/0333318 A1* | 11/2015 | Huang | H01M 4/134 429/338 |

* cited by examiner

*Primary Examiner* — Jacob T Minskey
*Assistant Examiner* — Matthew Hoover
(74) *Attorney, Agent, or Firm* — ScienBiziP, P.C.

(57) ABSTRACT

The present disclosure relates to a method for making a lithium-sulfur battery separator. The method comprises providing a separator substrate, and forming a functional layer on at least one surface of the separator substrate. A method for forming the functional layer comprises applying a first carbon nanotube layer on the at least one surface; dispersing a plurality of graphene oxide sheets and a plurality of manganese dioxide nanoparticles in a solvent to form a mixture; and depositing the mixture on a surface of the first carbon nanotube layer to form a first graphene oxide composite layer; applying a second carbon nanotube layer on a surface of the first graphene oxide composite layer; and forming a second graphene oxide composite layer on a surface of the second carbon nanotube layer.

15 Claims, 13 Drawing Sheets

(51) Int. Cl.
*H01M 2/14* (2006.01)
*H01M 2/16* (2006.01)
*H01M 2/18* (2006.01)
*B32B 5/12* (2006.01)
*B32B 5/24* (2006.01)
H01M 4/38 (2006.01)
H01M 10/052 (2010.01)

METHOD FOR MAKING LITHIUM-SULFUR BATTERY SEPARATOR

CROSS-REFERENCE TO RELATED APPLICATIONS

This application claims all benefits accruing under 35 U.S.C. § 119 from China Patent Application No. 201610799889.3, filed on Aug. 31, 2016, in the China Intellectual Property Office, the contents of which are hereby incorporated by reference. The application is also related to copending applications entitled, "LITHIUM-SULFUR BATTERY SEPARATOR AND LITHIUM-SULFUR BATTERIES USING THE SAME", filed Jul. 19, 2017 Ser. No. 15/653,541.

FIELD

The present disclosure relates to a method for making lithium-sulfur battery separator.

BACKGROUND

A lithium-sulfur battery cathode is sulfur, and a lithium-sulfur battery anode is elemental lithium. During electrical discharge process, the elemental lithium loses electrons to become lithium-ion, the sulfur reacts with the lithium-ion and the electrons to produce sulfides. A reaction equation is expressed as follows: $S_8+16Li^++16e^{-1}=8Li_2S$. A lithium-sulfur battery has advantages of low-cost, environmental friendliness, good safety, and high theoretical specific capacity.

Separator is an important component of the lithium-sulfur battery. The separator is to separate the cathode and the anode to avoid an internal short-circuit. However, polysulfides formed during an electrical discharge process have a high polarity and can easily dissolve into an electrolyte, lithium-sulfur battery separators obtained by conventional methods are difficult to inhibit polysulfide diffusion. With a great loss of active sulfur, a "shuttle effect" would occur between electrodes. Thus the specific capacity and cycling stability of the lithium-sulfur battery would be limited.

BRIEF DESCRIPTION OF THE DRAWINGS

Implementations of the present technology will now be described, by way of example only, with reference to the attached figures, wherein.

DETAILED DESCRIPTION

Figure 1:
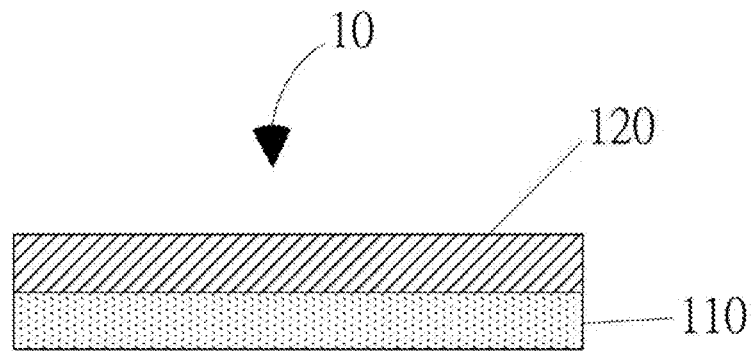
FIG. 1 is a structure schematic view of one embodiment of a lithium-sulfur battery separator.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
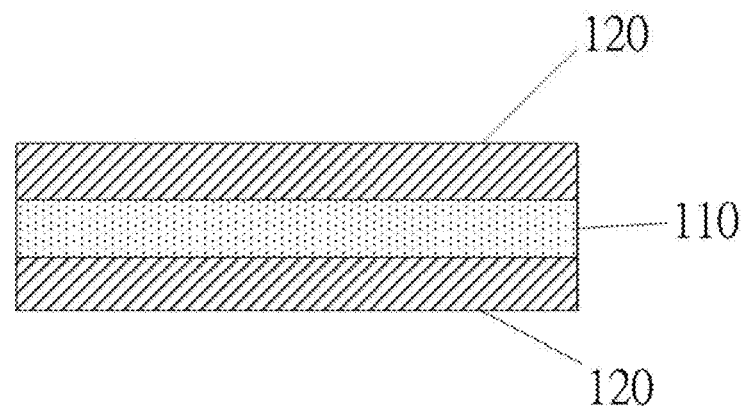
FIG. 2 is another structure schematic view of one embodiment of the lithium-sulfur battery separator.

Referring to FIG. 1, one embodiment is described in relation to a lithium-sulfur battery separator 10. The lithium-sulfur battery separator 10 comprises a separator substrate 110 and a functional layer 120. The separator substrate 110 comprises a first surface and a second surface opposite to the first surface. The functional layer 120 is covered on at least one surface of the first surface and the second surface. In one embodiment, the functional layer 120 is only covered on the first surface. Referring to FIG. 2, in one embodiment, the functional layer 120 is covered on both the first surface and the second surface. The separator substrate 110 is located between two functional layers 120.

The separator substrate 110 can be a microporous polyolefin membrane. The microporous polyolefin membrane comprises a polypropylene (PP) film, a polyethylene (PE) film, or a multilayer composite film of the PP film and the PE film. The separator substrate 110 comprises a plurality of micro pores. In one embodiment, the separator substrate 110 is a PE film having a thickness of 20 micrometers, and a size of each of the plurality of micro pores in the PE film is about 1 micrometer.

Figure 3:
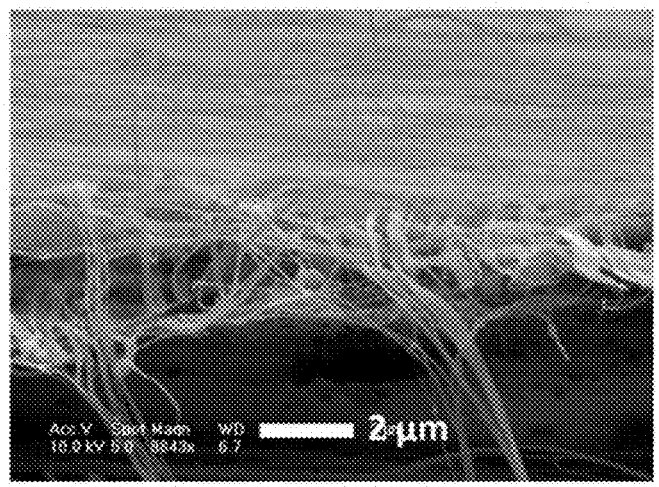
FIG. 3 is a cross-section morphology of one embodiment of a functional layer of the lithium-sulfur battery separator.

A thickness of the functional layer 120 can be ranged from about 1 micrometer to about 3 micrometers. Referring to FIG. 3, in one embodiment, the thickness of the functional layer 120 is about 2 micrometers.

Figure 4:
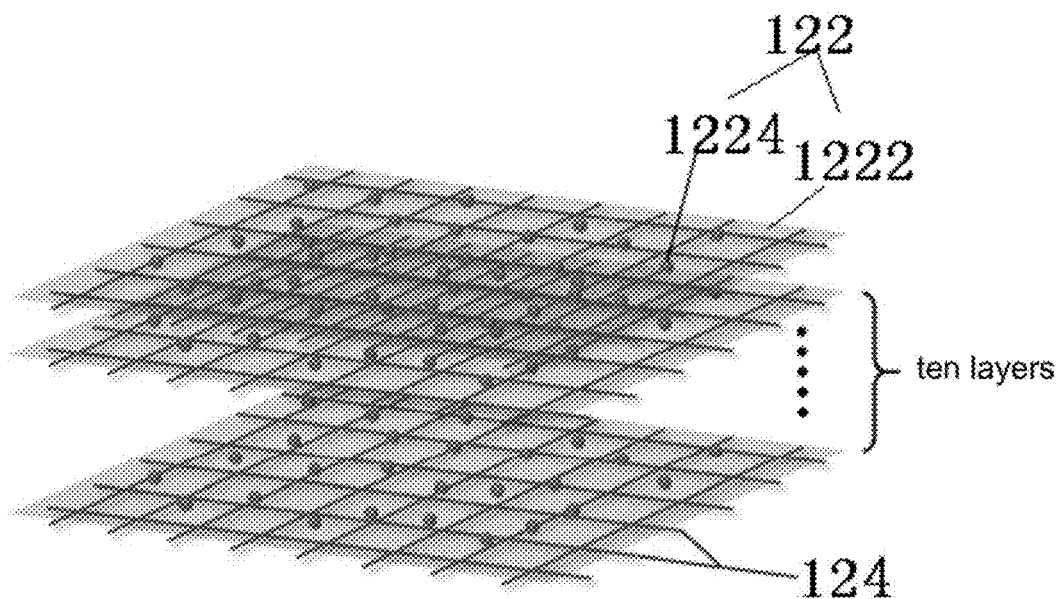
FIG. 4 is a structure schematic view of one embodiment of the functional layer of the lithium-sulfur battery separator.

Referring to FIG. 4, the functional layer 120 comprises at least two graphene oxide composite layers 122 and at least two carbon nanotube layers 124. The at least two graphene oxide composite layers 122 and the at least two carbon nanotube layers 124 are alternatively overlapped with each other to form a multi-layer structure, which is located on at least one surface of the first surface and the second surface. One of the at least two carbon nanotube layers 124 is directly contact with the separator substrate 110. Each of the at least two graphene oxide composite layers 122 comprises a plurality of graphene oxide sheets 1222 and a plurality of manganese dioxide ($MnO_2$) nanoparticles 1224. The plurality of graphene oxide sheets 1222 are flatly covered on the carbon nanotube layers 124. The plurality of graphene oxide sheets 1222 are overlapped with each other. The plurality of $MnO_2$ nanoparticles 1224 are uniformly adsorbed on the plurality of graphene oxide sheets 1222, and embedded in an interlayer formed by the carbon nanotube layer 124 and the graphene oxide sheets 1222. In one embodiment, an amount of the graphene oxide composite layers 122 is equal to an amount of the carbon nanotube layer 124. In one embodiment, both the amount of the graphene oxide composite layers 122 and the amount of the carbon nanotube layer 124 ranges from about 8 layers to about 12 layers. When the number of the graphene oxide composite layers 122 and the number of the carbon nanotube layer 124 are too large, the thickness of the functional layer 120 is too large and an energy density of the lithium-sulfur battery would be reduced; on the contrary, an electrochemical reactivity of the lithium-sulfur battery separator 10 would be poor and a shuttle effect of the polysulfide would occur. In one embodiment, the functional layer 120 comprises ten graphene oxide composite layers 122 and ten carbon nanotube layers 124 stacked and alternated with each other.

Figure 5:
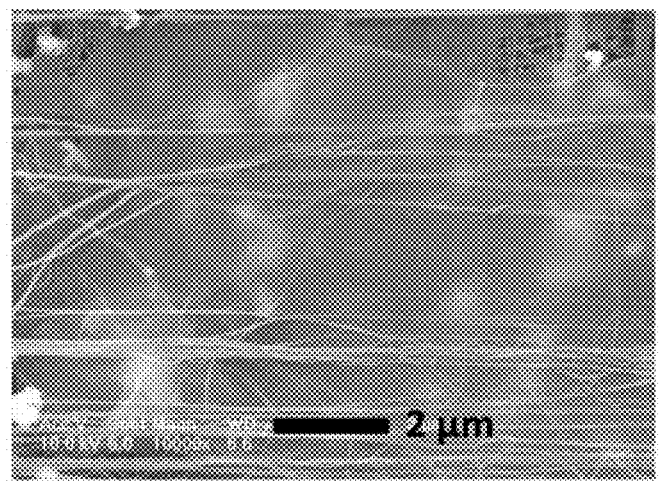
FIG. 5 is a surface morphology of the functional layer of the lithium-sulfur battery separator.

Referring to FIG. 5, the $MnO_2$ nanoparticles 1224 are uniformly dispersed on the surface of the functional layer 120, and the graphene oxide sheets 1222 and the $MnO_2$ nanoparticles 1224 are uniformly distributed in the functional layer 120.

A diameter of each of the plurality of $MnO_2$ nanoparticles 1224 can be ranged from about 5 nanometers to about 10 nanometers. A weight ratio between the plurality of $MnO_2$ nanoparticles 1224 and the plurality of graphene oxide sheets 1222 can be ranged from about 1:2 to about 1:1. In one embodiment, the weight ratio between the plurality of $MnO_2$ nanoparticles 1224 and the plurality of graphene oxide sheets 1222 is about 1:1

The plurality of $MnO_2$ nanoparticles 1224 can be adsorbed on the plurality of graphene oxide sheets 1222 by strong van der Waals force. The size of each of the plurality of $MnO_2$ nanoparticles 1224 is small. A size of each of the graphene oxide sheets 1222 is large, and a mechanical strength of the graphene oxide sheets 1222 is large. Therefore, the plurality of $MnO_2$ nanoparticles 1224 can be firmly adsorbed on the plurality of graphene oxide sheets 1222. In addition, the carbon nanotube layer 124 is a pure structure consisting of carbon nanotubes, and a size of the pores in the carbon nanotube layer 124 is only a few tens of nanometers; thus, the graphene oxide composite layers 122 can be fixed by the carbon nanotube layer 124, and the plurality of $MnO_2$ nanoparticles 1224 will not move freely in the pores of the carbon nanotube layer 124.

Figure 6:
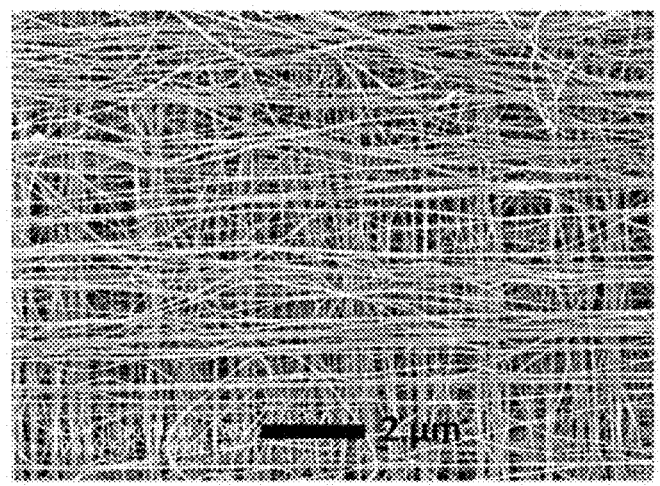
FIG. 6 is a scanning electron microscope image of one embodiment of a carbon nanotube layer of the lithium-sulfur battery separator.

The carbon nanotube layer 124 can be one carbon nanotube film or at least two carbon nanotube films stacked with each other. Referring to FIG. 6, in one embodiment, the carbon nanotube layer 124 is one carbon nanotube film, adjacent carbon nanotube layers are crossed with each other, and an angle between adjacent carbon nanotube layers is about 90 degrees. When the carbon nanotube layer 124 comprises at least two carbon nanotube films stacked with each other, the at least two carbon nanotube films are tightly joined together by van der Waals forces. In one embodiment, the at least two carbon nanotube films are crossed with each other, and an angle between adjacent carbon nanotube films is about 90 degrees. In one embodiment, the carbon nanotube layer 124 is formed by two carbon nanotube films stacked and crossed with each other, an angle between the two carbon nanotube films is about 90 degrees.

The carbon nanotube film consists of a plurality of carbon nanotubes. An end of one carbon nanotube is joined to an end of an adjacent carbon nanotube arranged substantially along the same direction by van der Waals force. In one embodiment, the carbon nanotube film is a drawn carbon nanotube film. A large number of carbon nanotubes in the drawn carbon nanotube film can be oriented along a preferred direction, meaning that a large number of the carbon nanotubes in the drawn carbon nanotube film are arranged substantially along the same direction. A minority of carbon nanotubes in the drawn carbon nanotube film may be randomly aligned. However, the number of randomly aligned carbon nanotubes is very small and does not affect the overall oriented alignment of the majority of carbon nanotubes in the drawn carbon nanotube film.

Oxygen-containing functional groups of the graphene oxide sheets 1222 and the $MnO_2$ nanoparticles 1224 have a strong chemical adsorption on polysulfides, and the carbon nanotube layer 124 has excellent mechanical properties and electrical conductivity. Therefore, the lithium-sulfur battery separator 10 exhibits superior performance to confine the polysulfides diffusion, the "shuttle effect" between the cathode and the anode can be avoided; and an electrochemical reactivity of the lithium-sulfur battery with the lithium-sulfur battery separator 10 is enhanced.

One embodiment is described in relation to a method for making the lithium-sulfur battery separator 10. The method comprises the following steps:

step (S1), providing the separator substrate 110; and step (S2), forming the functional layer 120 on a surface of the separator substrate 110, which comprises sub-steps of:

step (S21), applying a first carbon nanotube layer on the surface of the separator substrate 110;

step (S22), providing the plurality of graphene oxide sheets 1222 and the plurality of $MnO_2$ nanoparticles 1224, dispersing the plurality of graphene oxide sheets 1222 and the plurality of $MnO_2$ nanoparticles 1224 in a solvent to form a mixture, and depositing the mixture on a surface of the first carbon nanotube layer to form a first graphene oxide composite layer;

step (S23), applying a second carbon nanotube layer on a surface of the first graphene oxide composite layer; and step (S24), forming a second graphene oxide composite layer on a surface of the second carbon nanotube layer.

In step (S2), the solvent can be a volatile nonpolar solvent, such as ethanol and isopropanol. In one embodiment, the solvent is ethanol.

Both the first carbon nanotube layer and the second carbon nanotube layer are the same as the carbon nanotube layer 124. In one embodiment, both the first carbon nanotube layer and the second carbon nanotube layer are formed by two carbon nanotube films stacked and crossed with each other, and an angle between the two carbon nanotube films is about 90 degrees.

The carbon nanotube film can be drawn from a carbon nanotube array via a stretch tool. The carbon nanotube film is directly laid on the separator substrate 110 after drawn from the carbon nanotube array. In one embodiment, a height of the carbon nanotube array is about 300 micrometers. A diameter of the carbon nanotubes of the carbon nanotube array can range from about 20 nanometers to about 30 nanometers. A method of the drawn carbon nanotube film is taught by U.S. Pat. No. 8,048,256 to Feng et al.

When the first carbon nanotube layer comprises more than two carbon nanotube films, a method of applying the first carbon nanotube layer on the surface of the separator substrate 110 comprises the following steps: step (S211), laying a first carbon nanotube film on the surface of the separator substrate 110; step (S212), laying a second carbon nanotube film on a surface of the first carbon nanotube film, wherein a first extending direction of the carbon nanotubes in the first carbon nanotube film intersects with a second extending direction of the carbon nanotubes in the second carbon nanotube film; step (S213), laying a third carbon nanotube film on a surface of the second carbon nanotube film, wherein a third extending direction of the carbon nanotubes in the third carbon nanotube film intersects with the second extending direction of the carbon nanotubes in the second carbon nanotube film; and step (S214) repeating above steps until the first carbon nanotube layer is obtained. When the first carbon nanotube layer comprises two carbon nanotube films, the method of applying the first carbon nanotube layer on the surface of the separator substrate 110 only comprises step (S211) and step (S212). In one embodiment, the first carbon nanotube film is laid on the surface of the separator substrate 110; then the second carbon nanotube film is laid on the surface of the first carbon nanotube film, and the first extending direction is substantially perpendicular with the second extending direction.

A method for applying the second carbon nanotube layer on the surface of the first graphene oxide composite layer is the same as the method for applying the first carbon nanotube layer on the surface of the separator substrate 110.

In step (S21), further comprising fixing the separator substrate 110 to a planar glass before applying the first carbon nanotube layer on the surface of the separator substrate 110.

In step (S22), the plurality of graphene oxide sheets 1222 and the plurality of $MnO_2$ nanoparticles 1224 are uniformly dispersed in the solvent by mechanical stirring or ultrasonication. A weight ratio between the plurality of $MnO_2$ nanoparticles 1224 and the plurality of graphene oxide sheets 1222 can be ranged from about 1:2 to about 1:1. In one embodiment, 5 mg graphene oxide sheets and 5 mg $MnO_2$ nanoparticles are dispersed in 40 mL solution by intensive ultrasonication for 30 min.

A method for depositing the mixture on the surface of the first carbon nanotube layer comprises the following steps: the mixture is uniformly deposited on the surface of the first carbon nanotube layer by a dropper or a slow dumping; the first carbon nanotube layer is impregnated by the mixture; and the solvent in the mixture is removed by heating.

The plurality of $MnO_2$ nanoparticles 1224 can be adsorbed on the plurality of graphene oxide sheets 1222 by van der Waals force by mechanical stirring or ultrasonic shock, in addition, the size of each of the plurality of $MnO_2$ nanoparticles 1224 is small and the size of each of the graphene oxide sheets 1222 is large, and the mechanical strength of the graphene oxide sheets 1222 is large; thus, the plurality of $MnO_2$ nanoparticles 1224 can be firmly adsorbed on the graphene oxide sheets.

In one embodiment, step (S23) and step (S24) are repeated at least two times to form the functional layer 120 comprising at least two graphene oxide composite layers 122 and at least two carbon nanotube layers 124 stacked and alternated with each other. In other embodiments, step (S23) and step (S24) are repeated seven times to eleven times.

In one embodiment, step (S23) and step (S24) are repeated nine times to form a functional layer comprising ten graphene oxide composite layers 122 and ten carbon nanotube layers 124 alternatively stacked with each other. Firstly, laying the second carbon nanotube layer on the surface of the first graphene oxide composite layer, and forming the second graphene oxide composite layer on the surface; laying the third carbon nanotube layer on a surface of the second graphene oxide composite layer, and forming a third graphene oxide composite layer on a surface of the third carbon nanotube layer; repeating above steps until ten carbon nanotube layers are formed on the separator substrate 110. And, each of the ten carbon nanotube layers is covered by one graphene oxide composite layer.

A surface of the separator substrate 110 is defined as the first surface, and a surface of the separator substrate 110 opposite to the first surface is defined as the second surface. In one embodiment, in step (S2), the functional layer 120 is formed on both the first surface and the second surface.

One embodiment is described in relation to a lithium-sulfur battery. The lithium-sulfur battery comprises a positive electrode, a negative electrode, a lithium-sulfur battery separator, and an electrolytic solution. The lithium-sulfur battery separator is located between the positive electrode and the negative electrode. The positive electrode is a composite electrode comprising sulfur and carbon nanotubes, and a weight ratio between the sulfur and the positive electrode ranges from about 60 wt % to about 80 wt %. The carbon nanotubes have excellent mechanical properties, conductivity, and large aspect ratio, thus the positive electrode has excellent mechanical properties and conductivity without polymer binder or current collector, further improving an energy density of the lithium-sulfur battery. The negative electrode is a metallic lithium foil. The lithium-sulfur battery separator is the lithium-sulfur battery separator 10.

EXAMPLE 1

In the lithium-sulfur battery of this example, the positive electrode is the composite electrode comprising sulfur and carbon nanotubes, and the weight ratio between the sulfur and the positive electrode is about 75 wt %. The negative electrode is the metallic lithium foil. The electrolytic solution is 1 M lithium bis(trifluoromethanesulfonyl)imide (LiTFSI) solution in 1,3-dioxolane (DOL)/Dimethoxyethane (DME) (volume ratio 1:1) with 0.2 M $LiNO_3$ as additive.

The lithium-sulfur battery separator comprises the separator substrate and the functional layer. The separator substrate is a polyethylene film having a thickness of 20 micrometers. The functional layer comprises ten graphene oxide composite layers and ten carbon nanotube layers alternatively stacked with each other. The plurality of $MnO_2$ nanoparticles are uniformly adsorbed on the graphene oxide sheets, and embedded in an interlayer formed by the carbon nanotube layer and the graphene oxide sheets. The carbon nanotube layer is formed by ten carbon nanotube films stacked and crossed with each other.

Comparative Example 1

In this comparative example, the lithium-sulfur battery is the same as that in Example 1, except that the lithium-sulfur battery separator is a polyethylene film having a thickness of 20 micrometers.

Figure 7:
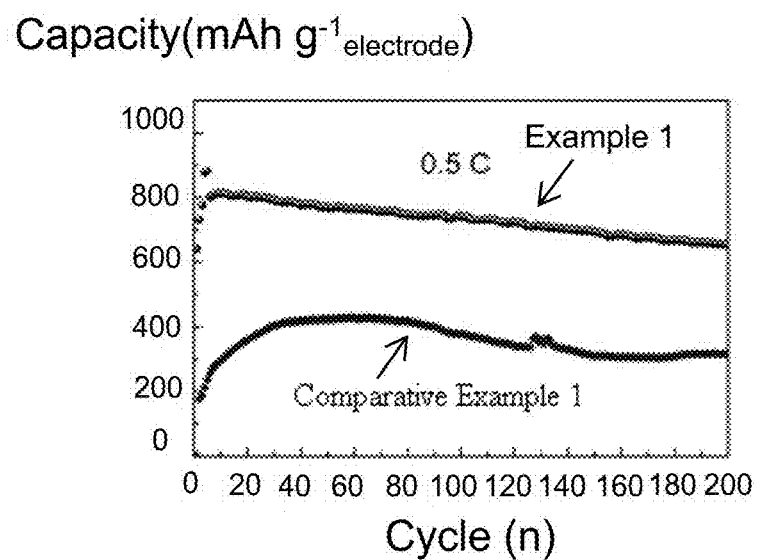
FIG. 7 is constant current charge-discharge test curves of a lithium-sulfur battery of Example 1 and a lithium-sulfur battery of Comparative Example 1.

Referring to FIG. 7, the lithium-sulfur battery in Example 1 is charged and discharged at a constant rate of 0.5 C, after a charge/discharge cycle is performed 200 times, a capacity of the lithium-sulfur battery of Example 1 is about 654 mA h g$^{-1}$ (relative to the electrode); however, a capacity of the lithium-sulfur battery of Comparative Example 1 is only 316 mA h g$^{-1}$ (relative to the electrode). It shows that the capacity and a capacity retention ratio of the lithium-sulfur battery of Example 1 are greatly improved compared with the lithium-sulfur battery of Comparative Example 1.

Figure 8:
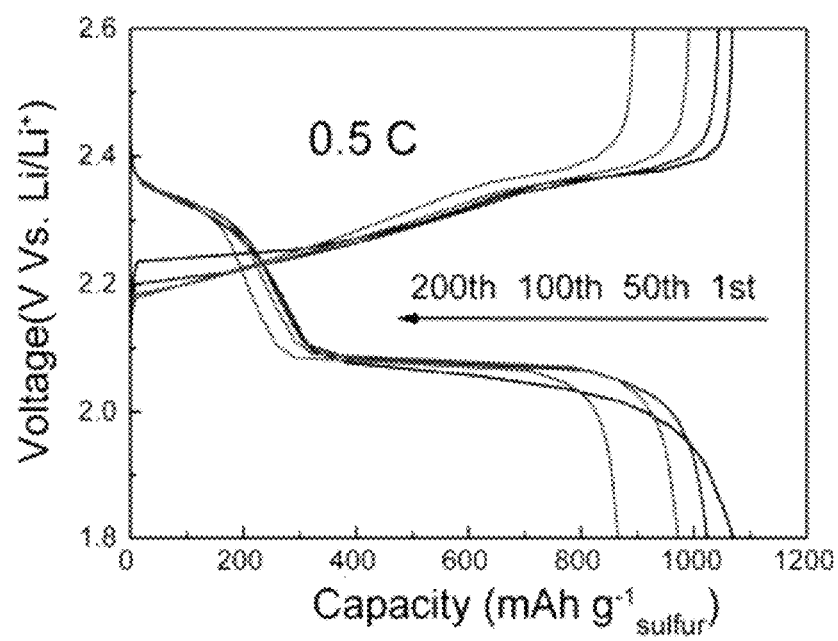
FIG. 8 is charge-discharge voltage profiles at different cycles of the lithium-sulfur battery of Example 1.

Referring to FIG. 8, it can be seen that after 200 charge/discharge cycles at a constant rate of 0.5 C, the capacity retention ratio of the lithium-sulfur battery of Example 1 is about 80.4%. After 1st, 50th, 100th, and 200th charge/discharge cycles, the lithium-sulfur battery has two typical discharge plateaus of 2.35V and 2.10V. It shows that the loss of active sulfur in the lithium-sulfur battery is greatly suppressed by the lithium-sulfur battery separator of Example 1, the "shuttle effect" is avoided between the cathode and the anode, and the electrochemical reactivity of the lithium-sulfur battery is improved.

Figure 9:
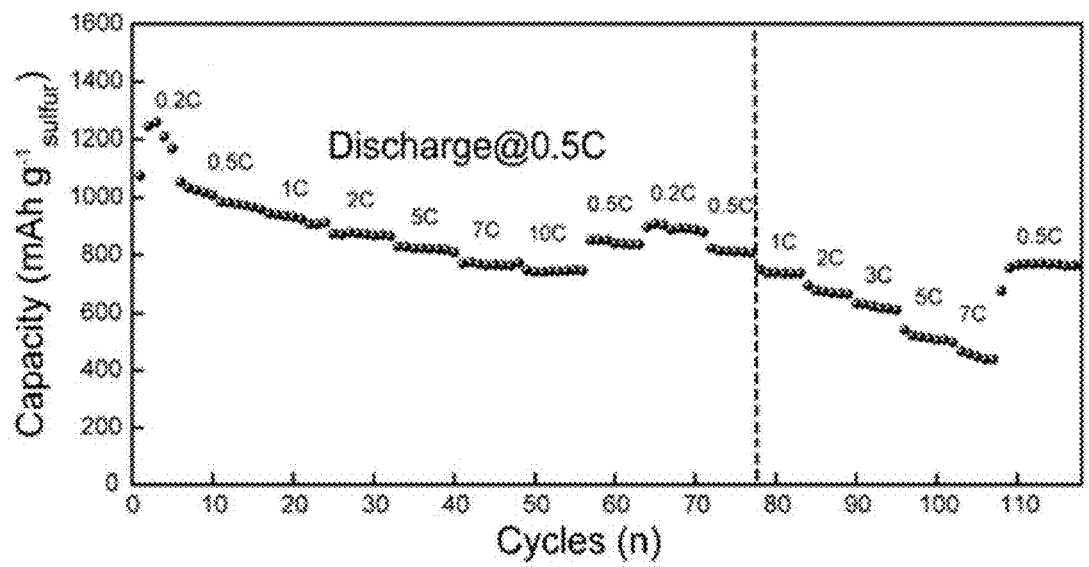
FIG. 9 is a cyclic stability performance at different charge/discharge rate of the lithium-sulfur battery of Example 1.

Referring to FIG. 9, a rate test is divided into a first part and a second part, in the first part, the lithium-sulfur battery of Example 1 is discharged at a constant rate of 0.5 C, then charged at 0.2 C, 0.5 C, 1 C, 5 C, 7 C and 10 C, respectively. It can be seen that the discharge capacity of the lithium-sulfur battery remains large and a capacity decay is quite small under high rate charge current. In the second part, the lithium-sulfur battery of Example 1 is charged/discharged at high rates, it can be seen that the capacity retention ratio of the lithium-sulfur battery is large under high rate charge/discharge current, and a capacity retention is excellent at post low-rate cycles. Therefore, the lithium-sulfur battery of Example 1 has excellent electrochemical properties.

Figure 10:
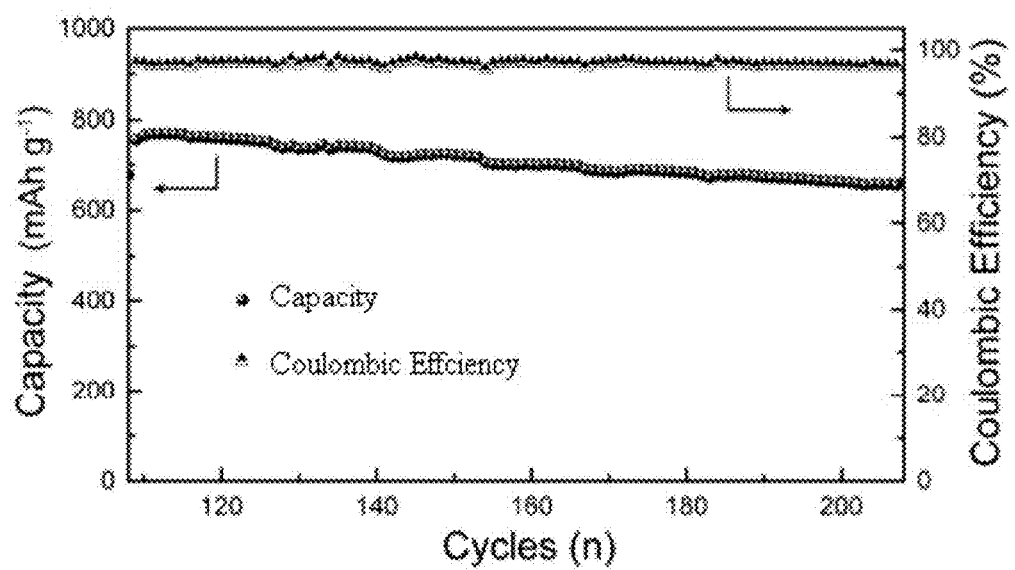
FIG. 10 is a cyclic stability performance at charge/discharge rate of 0.5 C of the lithium-sulfur battery of Example 1 after a rate test.

Referring to FIG. 10, it can be seen that after high rate charge/discharge test, a long cycle stability of the lithium-sulfur battery of Example 1 does not fade obviously. After one hundred charge/discharge cycles at constant rate of 0.5 C, the capacity of the lithium-sulfur battery of Example 1 is about 700 mA h g$^{-1}$.

Figure 11:
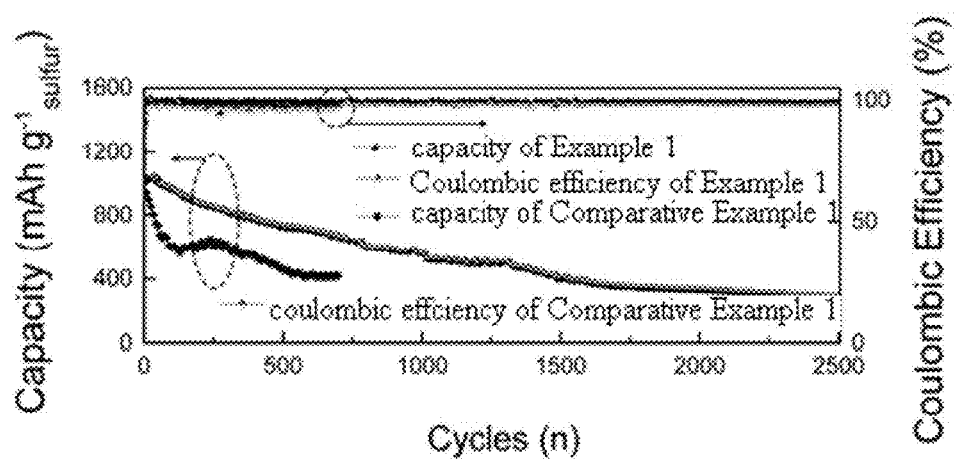
FIG. 11 is a prolonged cyclic stability performance of the lithium-sulfur battery of Example 1 and the lithium-sulfur battery of Comparative Example 1 at 1 C.

Referring to FIG. 11, it can be seen that after 2500 charge/discharge cycles at constant rate of 1 C, a discharge capacity of the lithium-sulfur battery of Example 1 is about 293 mA h g$^{-1}$, and a coulombic efficiency is up to 98.8%. However, the lithium-sulfur battery of Comparative Example 1 exhibited an obvious capacity fading process, and an internal short circuit occurs after 700 charge/discharge cycles. In addition, a coulombic efficiency of the lithium-sulfur battery of Comparative Example 1 is lower and has an obvious fluctuation compared to the lithium-sulfur battery of Example 1.

Figure 12:
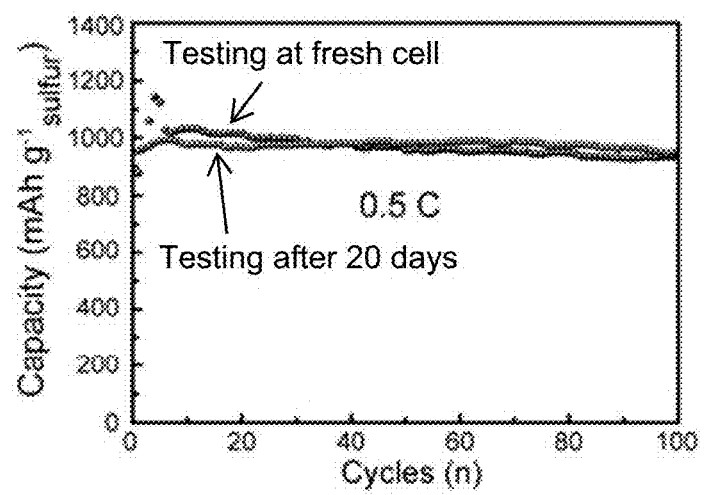
FIG. 12 is a self-discharge test of the lithium-sulfur battery of Example 1 after standing for 20 days.
Figure 13:
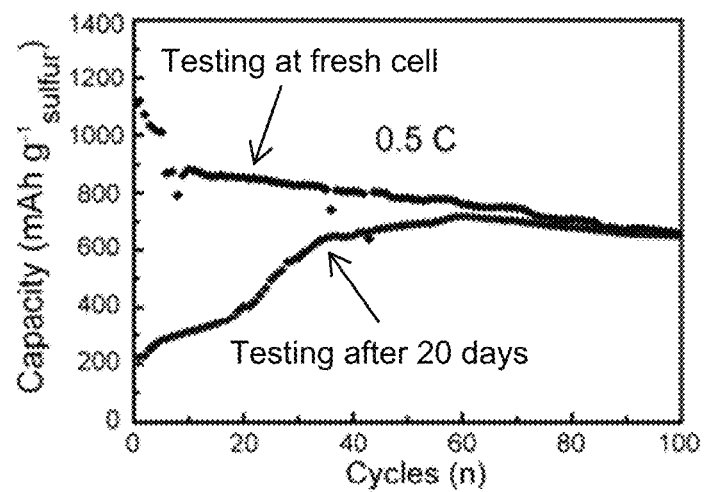
FIG. 13 is a self-discharge test of the lithium-sulfur battery of Comparative Example 1 after standing for 20 days.

Referring to FIG. 12, the lithium-sulfur battery of Example 1 still has excellent stability after standing for 20 days. A discharge capacity retention ratio is about 93.0%, and the lithium-sulfur battery of Example 1 shows excellent stability during 100 charge/discharge cycles process. However, referring to FIG. 13, the discharge capacity of the lithium-sulfur battery of Comparative Example 1 has an obvious decay after standing for 20 days. It can also be seen that during the 100 charge/discharge cycles process, the lithium-sulfur battery of Comparative Example 1 has an obvious activation process, but its discharge capacity is still not high. FIG. 12 and FIG. 13 show that the lithium-sulfur battery in Example 1 was substantially free from self-discharge, however, the lithium-sulfur battery in Comparative Example 1 has serious self-discharge phenomenon.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making a lithium-sulfur battery separator comprising
    step (S1), providing a separator substrate comprising a first surface and a second surface opposite to the first surface; and
    step (S2), forming a functional layer on at least one surface of the first surface and the second surface, and a method for forming the functional layer on at least one surface of the first surface and the second surface comprises sub-steps of:
    step (S21), applying a first carbon nanotube layer on the at least one surface of the first surface and the second surface;
    step (S22), providing a plurality of graphene oxide sheets and a plurality of manganese dioxide nanoparticles; dispersing the plurality of graphene oxide sheets and the plurality of manganese dioxide nanoparticles in a solvent to form a mixture; and depositing the mixture on a surface of the first carbon nanotube layer to form a first graphene oxide composite layer;
    step (S23), applying a second carbon nanotube layer on a surface of the first graphene oxide composite layer; and
    step (S24), forming a second graphene oxide composite layer on a surface of the second carbon nanotube layer.

2. The method of claim 1, wherein the first carbon nanotube layer comprises at least two carbon nanotube films stacked and crossed with each other.

3. The method of claim 2, wherein the first carbon nanotube layer comprises two carbon nanotube films stacked and crossed with each other, and a method of applying the first carbon nanotube layer on the at least one surface of the first surface and the second surface comprises the following steps:
    laying a first carbon nanotube film on the at least one surface of the first surface and the second surface; and
    laying a second carbon nanotube film on a surface of the first carbon nanotube film, wherein a first extending direction of the carbon nanotubes in the first carbon nanotube film intersects with a second extending direction of the carbon nanotubes in the second carbon nanotube film.

4. The method of claim 2, wherein the first carbon nanotube layer comprises more than two carbon nanotube films stacked and crossed with each other, and a method of applying the first carbon nanotube layer on the at least one surface of the first surface and the second surface comprises the following steps:
- step (S211), laying a first carbon nanotube film on the at least one surface of the first surface and the second surface;
- step (S212), laying a second carbon nanotube film on a surface of the first carbon nanotube film, wherein a first extending direction of the carbon nanotubes in the first carbon nanotube film intersects with a second extending direction of the carbon nanotubes in the second carbon nanotube film;
- step (S213), laying a third carbon nanotube film on a surface of the second carbon nanotube film, wherein a third extending direction of the carbon nanotubes in the third carbon nanotube film intersects with the second extending direction of the carbon nanotubes in the second carbon nanotube film; and
- step (S214), repeating step (S212) and step (S213) until the first carbon nanotube layer is obtained.

5. The method of claim 1, wherein the first carbon nanotube layer is directly laid on the separator substrate after drawn from a carbon nanotube array.

6. The method of claim 1, wherein in step (S21), further comprising fixing the separator substrate to a planar glass before applying the first carbon nanotube layer on the at least one surface of the first surface and the second surface.

7. The method of claim 1, wherein in step (S22), the plurality of graphene oxide sheets and the plurality of manganese dioxide nanoparticles are uniformly dispersed in the solvent by a mechanical stirring.

8. The method of claim 1, wherein in step (S22), the plurality of graphene oxide sheets and the plurality of manganese dioxide nanoparticles are uniformly dispersed in the solvent by an ultrasonic shock.

9. The method of claim 1, wherein a weight ratio between the plurality of manganese dioxide nanoparticles and the plurality of graphene oxide sheets is ranged from about 1:2 to about 1:1.

10. The method of claim 1, wherein a method of depositing the mixture on the surface of the first carbon nanotube layer comprises the following steps: the mixture is uniformly deposited on the surface of the first carbon nanotube layer; the first carbon nanotube layer is impregnated by the mixture; and the solvent in the mixture is removed by heating.

11. The method of claim 10, wherein the mixture is uniformly deposited on the surface of the first carbon nanotube layer by a dropper.

12. The method of claim 10, wherein the mixture is uniformly deposited on the surface of the first carbon nanotube layer by a slow dumping.

13. The method of claim 1, wherein step (S23) and step (S24) are repeated seven times to eleven times.

14. The method of claim 1, wherein a diameter of each of the plurality of manganese dioxide nanoparticles is ranged from about 5 nanometers to about 10 nanometers.

15. The method of claim 1, wherein a thickness of the functional layer is ranged from about 1 micrometer to about 3 micrometers.

* * * * *